US011996082B2

(12) United States Patent
Danjyo et al.

(10) Patent No.: US 11,996,082 B2
(45) Date of Patent: May 28, 2024

(54) ELECTRONIC MUSICAL INSTRUMENTS, METHOD AND STORAGE MEDIA

(71) Applicant: CASIO COMPUTER CO., LTD., Tokyo (JP)

(72) Inventors: Makoto Danjyo, Saitama (JP); Fumiaki Ota, Tokyo (JP); Atsushi Nakamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 718 days.

(21) Appl. No.: 17/129,653

(22) Filed: Dec. 21, 2020

(65) Prior Publication Data

US 2021/0193114 A1 Jun. 24, 2021

(30) Foreign Application Priority Data

Dec. 23, 2019 (JP) ................................ 2019-231927

(51) Int. Cl.
*G10L 13/10* (2013.01)
*G10H 7/02* (2006.01)
*G10L 13/02* (2013.01)

(52) U.S. Cl.
CPC ............... *G10L 13/10* (2013.01); *G10H 7/02* (2013.01); *G10L 13/02* (2013.01)

(58) Field of Classification Search
CPC ......... G10L 13/10; G10L 13/02; G10L 13/08; G10H 7/02; G10H 1/34; G10H 1/383; G10H 1/348; G10H 2220/011; G10H 2220/015; G10H 2240/056; G10H 2240/325; G10H 2250/015;
(Continued)

(56) References Cited

U.S. PATENT DOCUMENTS 5,777,251 A 7/1998 Hotta et al.
6,245,983 B1 6/2001 Ishiguro
10,002,604 B2 6/2018 Kayama et al.
(Continued)

FOREIGN PATENT DOCUMENTS

CN 107430848 A 12/2017
JP H02-269398 A 11/1990
(Continued)

OTHER PUBLICATIONS

Japanese Office Action dated Nov. 2, 2021, in a counterpart Japanese patent application No. 2019-231927. (A machine translation (not reviewed for accuracy) attached.).
(Continued)

*Primary Examiner* — Jeffrey Donels
(74) *Attorney, Agent, or Firm* — CHEN YOSHIMURA LLP

(57) ABSTRACT

In an electronic musical instrument that can output stored lyrics of a song in accordance with keyboard operations by a user, a processor determines whether a melody should be advanced or not while multiple keys of a keyboard are pressed by the user using prescribed criteria, if the processor determines that the melody should be advanced, the processor advances the lyric in response to the user's multiple key operation and if the processor determines that the melody should not be advanced, the processor does not advance the lyric in response to the user's multiple key operation.

15 Claims, 9 Drawing Sheets

(58) Field of Classification Search
CPC ....... G10H 2250/311; G10H 2250/455; G10H 1/0025; G10H 1/0033; G10H 7/00
See application file for complete search history.

(56) References Cited

U.S. PATENT DOCUMENTS

| | | | | |
|---|---|---|---|---|
| 10,825,433 | B2 | 11/2020 | Danjyo et al. | |
| 11,468,870 | B2 | 10/2022 | Danjyo et al. | |
| 2004/0040434 | A1 | 3/2004 | Kondo et al. | |
| 2014/0006031 | A1 | 1/2014 | Mizuguchi et al. | |
| 2014/0136207 | A1 | 5/2014 | Kayama et al. | |
| 2017/0025115 | A1 | 1/2017 | Tachibana et al. | |
| 2018/0018957 | A1 | 1/2018 | Hamano et al. | |
| 2018/0277075 | A1 | 9/2018 | Nakamura | |
| 2019/0318712 | A1* | 10/2019 | Nakamura | G10H 1/366 |
| 2019/0318715 | A1 | 10/2019 | Danjyo et al. | |
| 2019/0392798 | A1* | 12/2019 | Danjyo | G10H 7/008 |
| 2019/0392799 | A1* | 12/2019 | Danjyo | G10H 7/004 |
| 2019/0392807 | A1* | 12/2019 | Danjyo | G10L 13/033 |
| 2020/0294485 | A1 | 9/2020 | Danjyo et al. | |
| 2020/0312288 | A1 | 10/2020 | Sato | |
| 2021/0012758 | A1 | 1/2021 | Danjo et al. | |
| 2021/0027753 | A1 | 1/2021 | Danjyo et al. | |
| 2021/0193098 | A1 | 6/2021 | Danjo et al. | |
| 2021/0193114 | A1 | 6/2021 | Danjo et al. | |
| 2021/0295819 | A1 | 9/2021 | Danjo et al. | |
| 2022/0076651 | A1 | 3/2022 | Danjyo et al. | |
| 2022/0076658 | A1 | 3/2022 | Danjyo et al. | |

FOREIGN PATENT DOCUMENTS

| | | | |
|---|---|---|---|
| JP | H4-349497 | A | 12/1992 |
| JP | H05-188953 | A | 7/1993 |
| JP | 2000-276147 | A | 10/2000 |
| JP | 2003-295873 | A | 10/2003 |
| JP | 4735544 | B2 | 7/2011 |
| JP | 2011-221085 | A | 11/2011 |
| JP | 2012-083570 | A | 4/2012 |
| JP | 2014010190 | A | 1/2014 |
| JP | 2014-095856 | A | 5/2014 |
| JP | 2018-54767 | A | 4/2018 |
| JP | 2018-159831 | A | 10/2018 |
| JP | 2019-184936 | A | 10/2019 |
| JP | 6610715 | B1 | 11/2019 |
| JP | 2020-3816 | A | 1/2020 |
| JP | 2020-024456 | A | 2/2020 |
| JP | 2021-099461 | A | 7/2021 |

OTHER PUBLICATIONS

Japanese Office Action dated Nov. 2, 2021, in a counterpart Japanese patent application No. 2019-231928. (Cited in a related U.S. Appl. No. 17/129,724 and a machine translation (not reviewed for accuracy) attached.).

U.S. Appl. No. 17/129,724, filed Dec. 21, 2020.

U.S. Appl. No. 17/202,160, filed Mar. 15, 2021.

Japanese Office Action dated Jun. 20, 2023, in a counterpart Japanese patent application No. 2022-092637. (A machine translation (not reviewed for accuracy) attached.).

Office Action dated Apr. 21, 2023 in U.S. Appl. No. 17/129,724, which has been cross-referenced to the instant application. US Patent documents 1-4, US Patent Publication documents 1-14, and Foreign Patent documents 1-2 listed above were cited in that Office Action.

Office Action dated Nov. 21, 2023 in U.S. Appl. No. 17/202,160 which has been cross-referenced to the instant application. U.S. Patent No. 1, U.S. Patent Publications No. 1-2, and Foreign Patent documents No. 1-2 listed above were cited in that Office Action.

* cited by examiner

ELECTRONIC MUSICAL INSTRUMENTS, METHOD AND STORAGE MEDIA

BACKGROUND OF THE INVENTION

Technical Field

The present disclosure relates to electronic musical instruments, methods and storage media therefor.

Background Art

In recent years, the usage scene of synthetic voice has been expanding. Under such circumstances, it is preferable to have an electronic musical instrument that can not only produce automatic performance but also advance the lyrics according to the key press of the user (performer) and output the synthetic voice corresponding to the lyrics, thereby providing more flexible synthetic voice expression.

For example, Patent Document 1 discloses a technique for advancing lyrics in synchronization with a performance based on a user operation using a keyboard or the like.

RELATED ART DOCUMENT

Patent Document

Patent Document 1: Japanese Patent No. 4735544

SUMMARY OF THE INVENTION

However, when a plurality of sounds can be simultaneously produced by a keyboard or the like, for example, if the lyrics are advanced each time a key is pressed, the lyrics will advance too much when a plurality of keys are pressed at the same time.

Therefore, the present disclosure aims at providing an electronic musical instrument, a method, and a storage medium capable of appropriately controlling the progress of lyrics during the performance.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic musical instrument that can output stored lyrics of a song in accordance with operations by a user, comprising: a plurality of operating elements that receive operations by the user, the plurality of operating elements respectively specifying different pitches; and one or more processors electrically connected to the plurality of operating elements, the one or more processors performing the following: determining whether or not two or more operating elements among the plurality of operating elements are being operated by the user; while two or more operating elements are determined not being operated by the user, thereby only one of the plurality of the operating elements being played by the user, determining that the lyrics should advance and causing a digitally synthesized voice with a corresponding advanced lyric to be produced for a pitch specified by the user operation specifying a single pitch; and while two or more operating elements are determined being operated by the user, judging whether or not to advance the lyrics based on the operation of the user that specifies said two or more operating elements, and causing a digitally synthesized voice with a corresponding lyric to be produced for each of a plurality of pitches specified by the user operation.

According to this aspect of the present disclosure, the lyric progression can be appropriately controlled during the user performance.

It is to be understood that both the foregoing general description and the following detailed description are exemplary and explanatory, and are intended to provide further explanation of the invention as claimed.

DETAILED DESCRIPTION OF EMBODIMENTS

Figure 1:
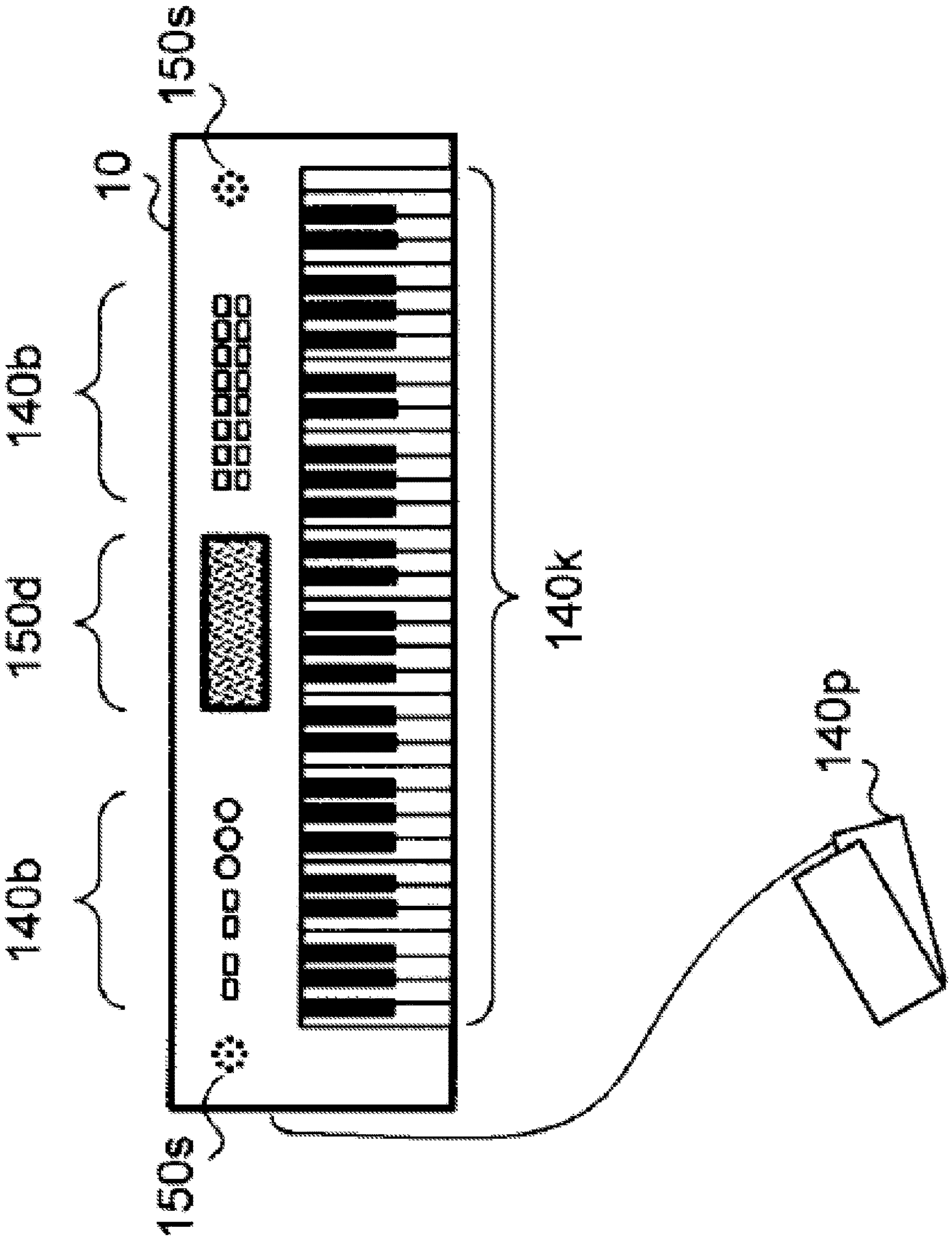
FIG. 1 shows an example of the overall appearance of an electronic musical instrument 10 according to an embodiment of the present invention.

Singing with two or more notes in a part originally composed of one syllable to one note (syllable style) is called melisma singing. Melisma singing may also be referred to as fake, kobushi, etc.

The present inventors have focused on a feature of melisma that an immediately preceding vowel is maintained and while the pitch thereof is freely changed and have developed a lyrics progress control method applicable to an electronic musical instrument equipped with a singing voice synthesis sound source of the present disclosure.

According to one aspect of the present disclosure, it is possible to control the lyrics not to progress during melisma. Further, even when a plurality of keys are pressed at the same time, it is possible to appropriately control whether or not the lyrics progress.

Hereinafter, embodiments of the present disclosure will be described in detail with reference to the accompanying drawings. In the following description, the same parts are designated by the same reference numerals. Since the same part has the same name and function, detailed explanation will not be repeated.

In this disclosure, "progress of lyrics", "progress of position of lyrics", "progress of singing position" and like expressions may be interchangeably used to express the same meaning. Further, in the present disclosure, "do not advance the lyrics", "do not control the progress of the lyrics", "hold the lyrics", "suspend the lyrics" and like expressions may be interchangeably used to express the same meaning.

(Electronic Musical Instrument)

FIG. 1 is a diagram showing an example of the overall appearance of an electronic musical instrument 10 according to an embodiment of the present invention. The electronic musical instrument 10 may be equipped with a switch (button) panel 140*b*, a keyboard 140*k*, a pedal 140*p*, a display 150*d*, a speaker 150*s*, and the like.

The electronic musical instrument 10 is a device that receives input from a user via playing elements such as a keyboard or switches, and that controls music performance, lyrics progression, and the like. The electronic musical instrument 10 may have a function of generating a sound according to performance information such as MIDI (Musical Instrument Digital Interface) data. The device 10 may be an electronic musical instrument (electronic piano, synthesizer, etc.), or may be an analog musical instrument equipped with a sensor or the like so as to process user performance electronically.

The switch panel 140*b* may include switches for operating a volume specification, a sound source, a tone color setting, a song (accompaniment) song selection (accompaniment), a song playback start/stop, a song playback setting (tempo, etc.), etc.

The keyboard 140*k* may have a plurality of keys as performance elements (operating elements). The pedal 140*p* may be a sustain pedal having a function of extending the sound of the pressed key while the pedal is being depressed, or may be a pedal for operating an effector that processes a tone, volume, or the like.

In the present disclosure, the sustain pedal, pedal, foot switch, controller (operator), switch, button, touch panel, etc. may be interchangeably used to mean the same functional element. Depressing the pedal in the present disclosure may be understood to mean operating the controller.

A key in a keyboard or the like may be referred to as a performance/playing/operating manipulator or element, a pitch manipulator or element, a tone manipulator or element, a direct manipulator or element, a first manipulator or element, or the like. A pedal or the like may be referred to as a non-playing element, a non-pitched element, a non-tone element, an indirect manipulator or element, a second operating manipulator or element, or the like.

The display 150*d* may display lyrics, musical scores, various setting information, and the like. The speakers 150*s* may be used to emit the sound generated by the performance.

The electronic musical instrument 10 may be configured to generate or convert at least one of a MIDI message (event) and an Open Sound Control (OSC) message.

The electronic musical instrument 10 may also be called a control device 10, a lyrics progression control device 10, and the like.

The electronic musical instrument 10 may be connected to a network (Internet, etc.) via at least one of wired and wireless (for example, Long Term Evolution (LTE), 5th generation mobile communication system New Radio (5G NR), Wi-Fi (registered trademark).

The electronic musical instrument 10 may hold singing voice data (may be called lyrics text data, lyrics information, etc.) related to lyrics whose progress is controlled in advance, or may transmit and/or receive such singing voice data via a network. The singing voice data may be text described by a musical score description language (for example, MusicXML), or may be a MIDI data storage format (for example, MusicXML). It may be written in Standard MIDI File (SMF) format), or it may be text given in a normal text file.

The electronic musical instrument 10 may also acquire the content of the user singing in real time through a microphone or the like provided in the electronic musical instrument 10, and may acquire the text data obtained by applying the voice recognition process to the electronic musical instrument 10 as singing voice data.

Figure 2:
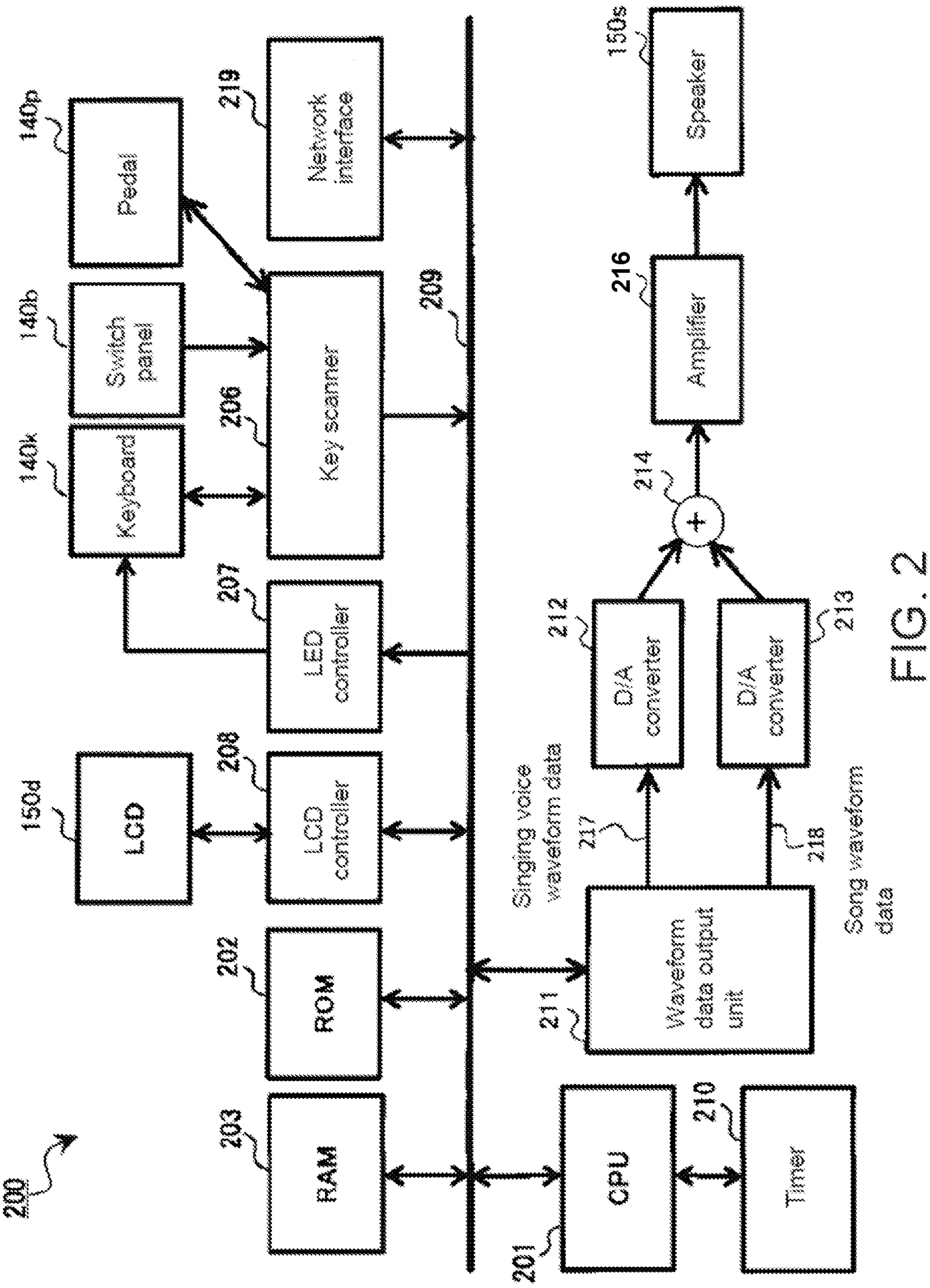
FIG. 2 shows an example of the hardware composition of the control system 200 of the electronic musical instrument 10 according to an embodiment.

FIG. 2 is a diagram showing an example of the hardware configuration of the control system 200 of the electronic musical instrument 10 according to an embodiment of the present invention.

Central processing unit (CPU) 201, ROM (read-only memory) 202, RAM (random access memory) 203, waveform data output unit 211, key scanner 206 to which switch (button) panel 140*b*, keyboard 140*k*, and pedal 140*p* in FIG. 1 are connected, LED controller 207, to which the keyboard 140*k* is connected, and LCD controller 208, to which the LCD (Liquid Crystal Display) as an example of the display 150*d* of FIG. 1 is connected, are connected to the system bus 209, respectively.

A timer 210 for controlling the sequence of automatic performance may be connected to the CPU 201. The CPU 201 may be referred to as a processor, and may include an interface with peripheral circuits, a control circuit, an arithmetic circuit, a register, and the like.

The CPU 201 performs various functions by loading predetermined software (program) from a storage device, such as ROM 202 or hard drive.

The CPU 201 executes control operation of the electronic musical instrument 10 of FIG. 1 by executing control program stored in the ROM 202 while using the RAM 203 as the work memory. In addition to the above control program and various fixed data, the ROM 202 may also store singing voice data, accompaniment data, and/or song data including these.

The timer 210 used in the present embodiment is included in the CPU 201, and counts the progress of the automatic performance of the electronic musical instrument 10, for example.

The waveform data output unit 211 may include a sound source LSI (large-scale integrated circuit), a voice synthesis LSI, and the like. The sound source LSI and the voice synthesis LSI may be integrated into one LSI.

The singing voice waveform data 217 and the song waveform data 218 output from the waveform data output unit 211 are converted into an analog singing voice output signal and an analog music sound output signal by the D/A converters 212 and 213, respectively. The analog music sound output signal and the analog singing voice output signal are mixed by the mixer 214, and after the mixed signal is amplified by the amplifier 216, the mixed signal is emitted from the speaker 150*s* or outputted from an output terminal.

The key scanner (scanner) 206 constantly scans the key pressing/releasing state of the keyboard 140*k* in FIG. 1, the switch operating state of the switch panel 140*b*, the pedal operating state of the pedal 140*p*, and the like, and interrupts the CPU 201 to report the finding.

The LCD controller 208 is an IC (integrated circuit) that controls the display state of the LCD, which is an example of the display 150*d*.

The system configuration explained above is an example and is not limited to this. For example, the number of each circuit included is not limited to this. The electronic musical instrument 10 may have a configuration that does not include a part of circuits (mechanisms), or may have a configuration in which the function of one circuit is realized by a plurality of circuits. It may also have a configuration in which the functions of a plurality of circuits are realized by one circuit.

In addition, the electronic instrument 10 may be constructed by various hardware, such as a microprocessor, a digital signal processor (DSP: Digital Signal Processor), an ASIC (Application Specific Integrated Circuit), a PLD (Programmable Logic Device), an FPGA (Field Programmable Gate Array), and the like. Such hardware may realize a part or all of each functional blocks. For example, the CPU 201 may be implemented on at least one of these types of hardware.

<Generation of acoustic model>

Figure 3:
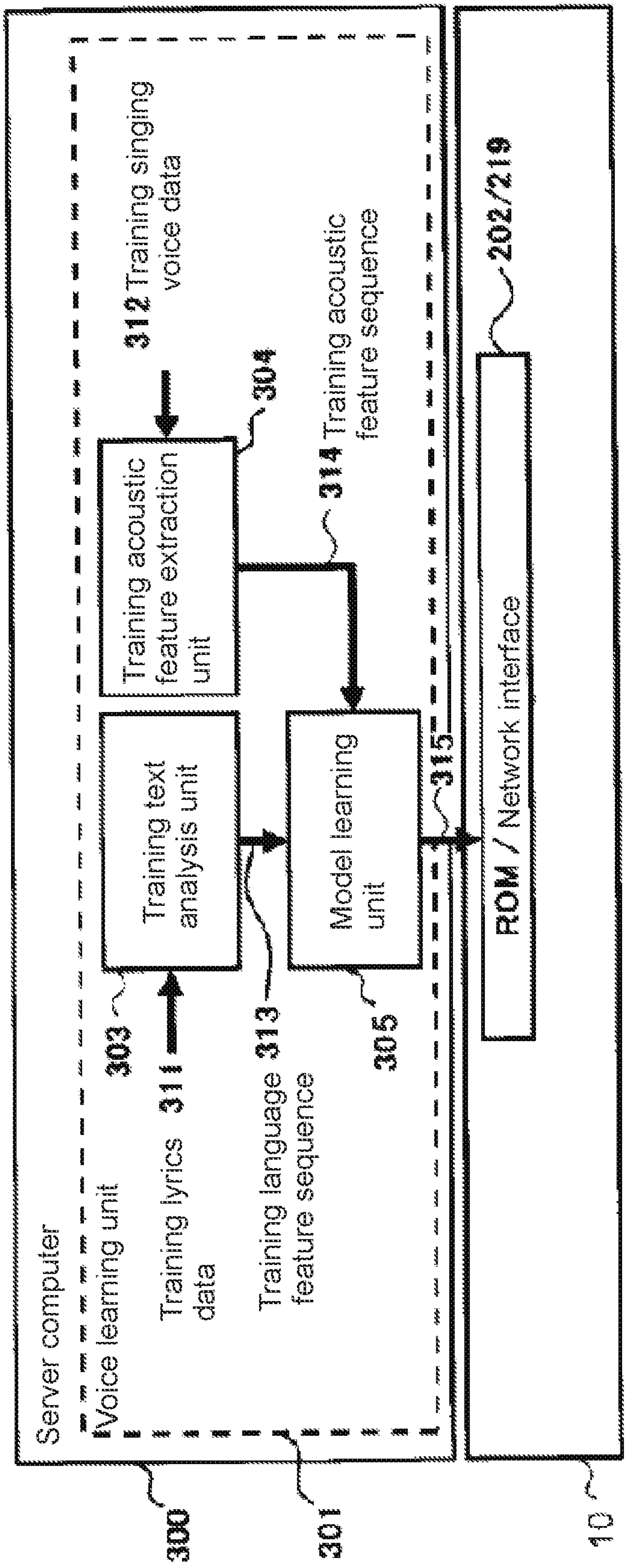
FIG. 3 shows a configuration example of the voice learning unit 301 according to an embodiment.

FIG. 3 is a diagram showing an example of the configuration of a voice learning unit 301 according to an embodiment of the present invention. The voice learning unit 301 may be implemented as a function executed by the server computer 300 existing outside the electronic musical instrument 10 of FIG. 1. The voice learning unit 301 may alternatively be built in the electronic musical instrument 10 as a function executed by the CPU 201, a voice synthesis LSI, and the like.

The voice learning unit 301 that realizes voice synthesis in the present disclosure and a waveform data output unit 211 described later may be implemented based on, for example, a statistical voice synthesis technique based on deep learning.

The voice learning unit 301 may include a training text analysis unit 303, a training acoustic feature extraction unit 304, and a model learning unit 305.

In the voice learning unit 301, as the training singing voice data 312, for example, a voice recording of a plurality of singing songs of an appropriate genre sung by a certain singer is used. Further, as the training singing data 311, the lyrics text of each song is prepared.

The training text analysis unit 303 receives the training singing data 311 that includes the lyrics text and analyzes the data. As a result, the training text analysis unit 303 estimates and outputs the training language feature sequence 313, which is a discrete numerical sequence expressing phonemes, pitches, etc., corresponding to the training singing data 311.

The training acoustic feature extraction unit 304 receives and analyzes the training singing voice data 312, which is acquired through a microphone or the like by a singer singing a lyrics text corresponding to the training singing data 311 in accordance with the input of the training singing data 311. As a result, the training acoustic feature extraction unit 304 extracts and outputs the learning acoustic feature sequence 314 representing the voice features corresponding to the training singing voice data 312.

In the present disclosure, the training acoustic feature sequence 314 and an acoustic feature sequence corresponding to an acoustic feature sequence described later include acoustic feature data (formant information, spectrum information, etc.) modeling the human vocal tract and vocal cord sound source data (which may be called sound source information) that models a human vocal cord. As the spectrum information, for example, mel cepstral, line spectrum pairs (LSP) and the like may be used. As the sound source information, a fundamental frequency (F0) indicating the pitch frequency of human voice and power values can be used.

The model learning unit 305 estimates by machine learning an acoustic model that maximizes the probability that the training acoustic feature sequence 314 is generated from the training language feature sequence 313. That is, the relationship between the language feature sequence that is text and the acoustic feature sequence that is voice is expressed by a statistical model, which is an acoustic model. The model learning unit 305 outputs model parameters representing the acoustic model calculated as a result of the machine learning as a learning result 315. Therefore, the trained model constitutes the acoustic model.

HMM (Hidden Markov Model) may be used as the acoustic model expressed by the learning result 315 (model parameters).

An HMM acoustic model may learn how the characteristic parameters of the vocal cord vibration and vocal tract characteristics change over time when a singer utters lyrics along a certain melody. More specifically, the HMM acoustic model may be a phoneme-based model of the spectrum, fundamental frequency, and their time structure obtained from the training singing voice data.

First, the processing of the voice learning unit 301 of FIG. 3 in which the HMM acoustic model is adopted will be described. The model learning unit 305 in the voice learning unit 301 receives the training language feature sequence 313 output by the training text analysis unit 303 and the training acoustic feature sequence 314 output by the training acoustic feature extraction unit 304 and may learn the HMM acoustic model having the maximum likelihood.

The spectral parameters of the singing voice can be modeled by a continuous HMM. On the other hand, since the log fundamental frequency (F0) is a variable-dimensional time series signal that takes a continuous value in the voiced section and has no value in the unvoiced section, it cannot be directly modeled by a normal continuous HMM or a discrete HMM. Therefore, using a MSD-HMM (Multi-Space probability Distribution HMM), the spectral parameters of the singing voice are modeled by regarding mel cepstrum as a multidimensional Gaussian distribution, and the log fundamental frequency (F0) is modeled by regarding the logarithmic fundamental frequency (F0) in the voiced section as a one-dimensional Gaussian distribution and F0 in the unvoiced section as a zero-dimensional Gaussian distribution, at the same time.

Further, it is known that the characteristics of phonemes constituting a singing voice fluctuate under the influence of various factors even if the phonemes have the same acoustic characteristics. For example, the spectrum and the logarithmic fundamental frequency (F0) of a phoneme, which is a basic unit of vocal sounds, differ depending on the singing style and tempo, the lyrics before and after, the pitch, and the like. These factors that affect such acoustic features are called contexts.

In the statistical voice synthesis processing according to an embodiment of the present invention, an HMM acoustic model (context-dependent model) in consideration of context may be adopted in order to accurately model the acoustic features of voice sound. Specifically, the training text analysis unit 303 considers not only the phonemes and pitches for each frame, but also the phonemes immediately before and after, the current position, the vibrato immediately before and after, the accent, and the like when outputting the training language feature sequence 313. In addition, decision tree-based context clustering may be used to improve the efficiency of context combinations.

For example, the model learning unit 305 may output a state continuation length decision tree as the learning result 315 based on the training language feature sequence 313 that corresponds to the contexts of a large number of phonemes concerning the state continuation length that is extracted by the training text analysis unit 303 from the training singing data 311.

Further, the model learning unit 305 may output, for example, a mel cepstrum parameter decision tree for determining mel cepstrum parameters as the learning result 315, based on the training acoustic feature sequence 314, which corresponds to a large number of phonemes relating to the mel cepstrum parameters that is extracted by the training acoustic feature extraction unit 304 from the training singing voice data 312.

Further, the model learning unit 305 may output, for example, the log fundamental frequency decision tree for determining the log fundamental frequency (F0) as the learning result 315, based on the training acoustic feature sequence 314, which corresponds to a large number of phonemes relating to the log fundamental frequency (F0) that is extracted by the training acoustic feature extraction unit 304 from the training singing voice data 312. Here, the log fundamental frequency (F0) in the voiced section and that in the unvoiced section may be modelled by MSD-HMM that can handle variable dimensions as a one-dimensional Gaussian distribution and as a zero-dimensional Gaussian distribution, respectively, in generating the log fundamental frequency decision tree.

In addition, instead of or in addition to the acoustic model based on HMM, an acoustic model based on Deep Neural Network (DNN) may be adopted. In this case, the model learning unit 305 may generate model parameters representing the nonlinear conversion function of each neuron in the DNN from the language features to the acoustic features as the learning result 315. According to DNN, it is possible to express the relationship between the language feature sequence and the acoustic feature sequence by using a complicated nonlinear transformation function that is difficult to express with a decision tree.

Further, the acoustic model of the present disclosure is not limited to these, and any voice synthesis method may be adopted as long as it is a technique using statistical voice synthesis processing such as an acoustic model combining HMM and DNN.

As shown in FIG. 3, the learning result 315 (model parameters) may be stored in the ROM 202 of the control system of the electronic musical instrument 10 of FIG. 2 at the time of shipment from the factory of the electronic musical instrument 10 of FIG. 1, and may be loaded from the ROM 202 of FIG. 2 into the singing voice control unit 307 described later in the waveform data output unit 211 when the electronic musical instrument 10 is turned on.

Alternatively, as shown in FIG. 3, for example, the learning result 315 may be downloaded to the singing voice control unit 307 in the waveform data output unit 211 from the outside such as the Internet via the network interface 219 by the user operating the switch panel 140*b* of the electronic musical instrument 10.

<Voice Synthesis Based on Acoustic Model>

Figure 4:
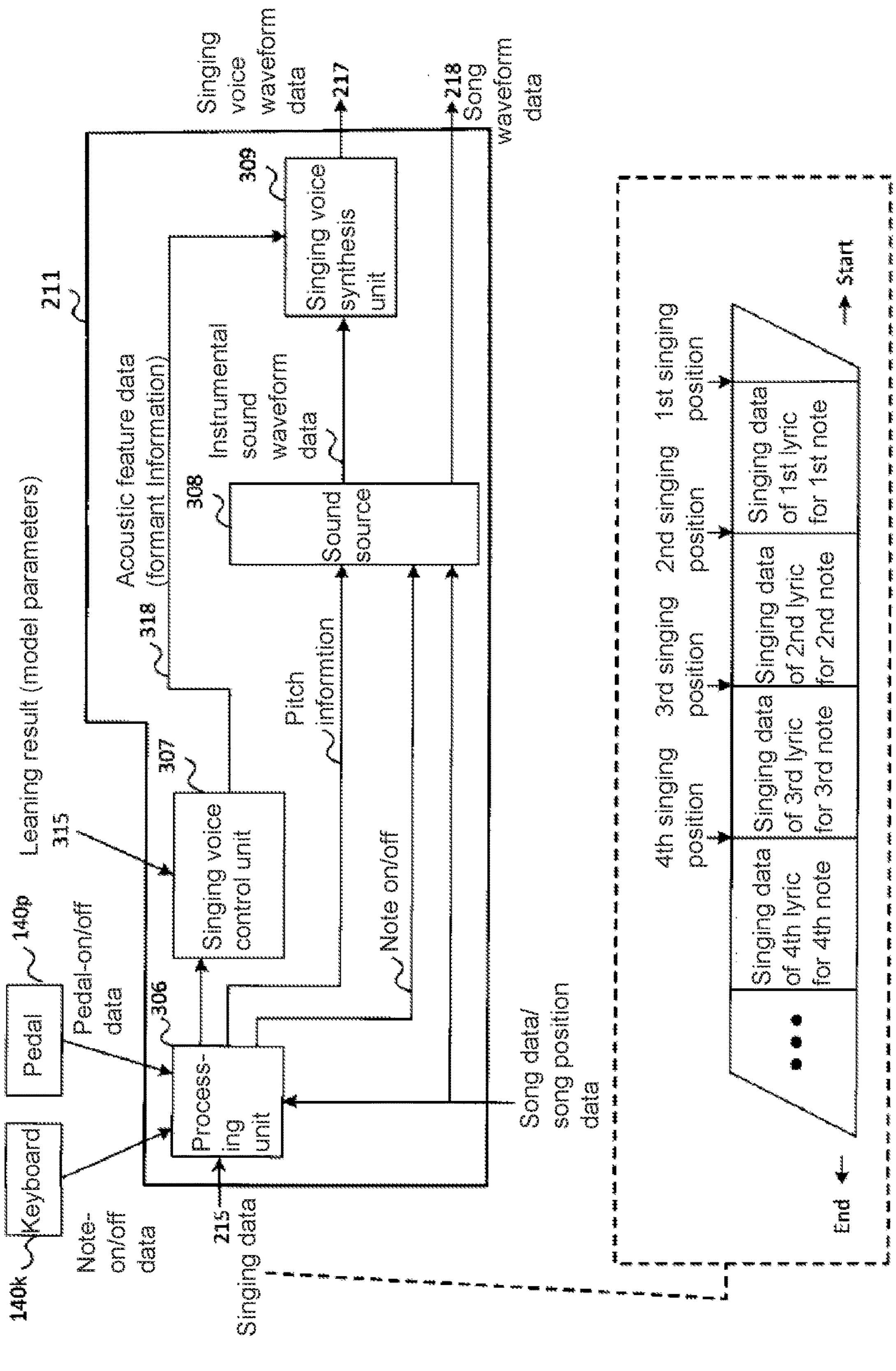
FIG. 4 shows an example of the waveform data output part 211 according to an embodiment.

FIG. 4 is a diagram showing an example of the waveform data output unit 211 according to an embodiment of the present invention.

The waveform data output unit 211 includes a processing unit (may be called a text processing unit, a preprocessing unit, etc.) 306, a singing voice control unit (may be called an acoustic model unit) 307, a sound source 308, and a singing voice synthesis unit (may be called a vocal model unit) 309 and the like.

The waveform data output unit 211 receives singing data 215 including lyrics and pitch information, which is instructed by the CPU 201 via the key scanner 206 of FIG. 2 based on the key pressed on the keyboard 140*k* of FIG. 1, and synthesizes and outputs the singing voice waveform data 217 corresponding to the lyrics and pitch. In other words, the waveform data output unit 211 executes a statistical voice synthesis process in which the singing voice waveform data 217 corresponding to the singing data 215 including the lyrics text is estimated and synthesized by a statistical model called an acoustic model that is set in the singing voice control unit 307.

Further, when the song data is reproduced, the waveform data output unit 211 outputs the song waveform data 218 corresponding to the corresponding singing position.

The processing unit 306 receives the singing data 215 including information on the phonemes, pitches, etc., of the lyrics designated by the CPU 201 of FIG. 2 as a result of the performer's performance in accordance with an automatic performance, and analyzes the data. The singing data 215 may include, for example, data (for example, pitch and note length data) of the n-th note, singing data of the n-th note, and the like.

For example, the processing unit 306 determines whether the lyrics should progress based on a lyrics progress control method described later based on the note on/off data, pedal on/off data, etc., which are obtained from the operation of the keyboard 140*k* and the pedal 140*p*, and acquires singing data 215 corresponding to the lyrics to be output. Then, the processing unit 306 analyzes the language feature sequence expressing the phonemes, part of speech, words, etc., corresponding to the pitch data specified by the key press and the acquired singing data 215, and outputs the language feature sequence to the singing voice control unit 307.

The singing data may include at least one of lyrics (characters), syllable type (start syllable, middle syllable, end syllable, etc.), lyrics index, corresponding voice pitch (correct voice pitch), and corresponding uttering period (for example, utterance start timing, utterance end timing, utterance duration: correct uttering period).

For example, in the example of FIG. 4, the singing data 215 includes the singing data of the n-th lyric corresponding to the n-th note (n=1, 2, 3, 4, . . . ), and information on the timing at which the n-th note should be played (the n-th lyric singing position).

The singing data 215 may include information (data in a specific audio file format, MIDI data, etc.) for playing the accompaniment (song data) corresponding to the lyrics. When the singing data is presented in the SMF format, the singing data 215 may have a track chunk in which data related to singing voice is stored and a track chunk in which data related to accompaniment is stored. The singing data 215 may be read from the ROM 202 into the RAM 203. The singing data 215 is stored in a memory (for example, ROM 202, RAM 203) before the performance.

The electronic musical instrument 10 may control the progress of automatic accompaniment based on an event indicated by the singing data 215 (for example, a meta event (timing information) that indicates the utterance timing and pitch of the lyrics, a MIDI event that instructs note-on or note-off, or a meta event that indicates a time signature, etc.).

Based on the language feature sequence input from the processing unit 306 and the acoustic model set as the learning result 315, the singing voice control unit 307 estimates the corresponding acoustic feature sequence. The formant information 318 corresponding to the acoustic feature sequence is then output to the singing voice synthesis unit 309.

For example, when the HMM acoustic model is adopted, the singing voice control unit 307 connects the HMMs with reference to the decision tree for each context obtained by the language feature sequence, and estimates the acoustic feature sequence (formant information 318 and the vocal cord sound source data 319) that makes the output probability from each connected HMM maximum.

When the DNN acoustic model is adopted, the singing voice control unit 307 may output the acoustic feature sequence for each frame with respect to the phoneme sequence of the language feature sequence that is inputted for each frame.

In FIG. 4, the processing unit 306 acquires musical instrument sound data (pitch information) corresponding to the pitch indicated by the pressed key from the memory (which may be ROM 202 or RAM 203) and outputs it to the sound source 308.

The sound source 308 generates a sound source signal (may be called instrumental sound waveform data) of musical instrument sound data (pitch information) corresponding to the sound to be produced (note-on) based on the note-on/off data inputted from the processing unit 306, and outputs it to the singing voice synthesis unit 309. The sound source 308 may execute control processing such as envelope control of the sound to be produced.

The singing voice synthesis unit 309 forms a digital filter that models the vocal tract based on the sequence of the formant information 318 sequentially inputted from the singing voice control unit 307. Further, the singing voice synthesis unit 309 uses the sound source signal input from the sound source 308 as an excitation source signal, applies the digital filter, and generates and outputs the singing voice waveform data 217, which is a digital signal. In this case, the singing voice synthesis unit 309 may be called a synthesis filter unit.

In addition, various voice synthesis methods, such as a cepstrum voice synthesis method and an LSP voice synthesis method, may be adopted for the singing voice synthesis unit 309.

In the example of FIG. 4, since the output singing voice waveform data 217 uses the musical instrument sound as the sound source signal, the fidelity is slightly lost as compared with the actual singing voice of the singer. However, both of the instrumental sound atmosphere and the voice sound quality of the singer remain in the resulting singing voice waveform data 217, thereby producing effective singing voice waveform data.

The sound source 308 may output the output of another channel as the song waveform data 218 together with the processing of the musical instrument sound wave data. As a result, the accompaniment sound can be produced with a regular musical instrument sound, or the musical instrument sound of the melody line and the singing voice of the melody can be produced at the same time.

Figure 5:
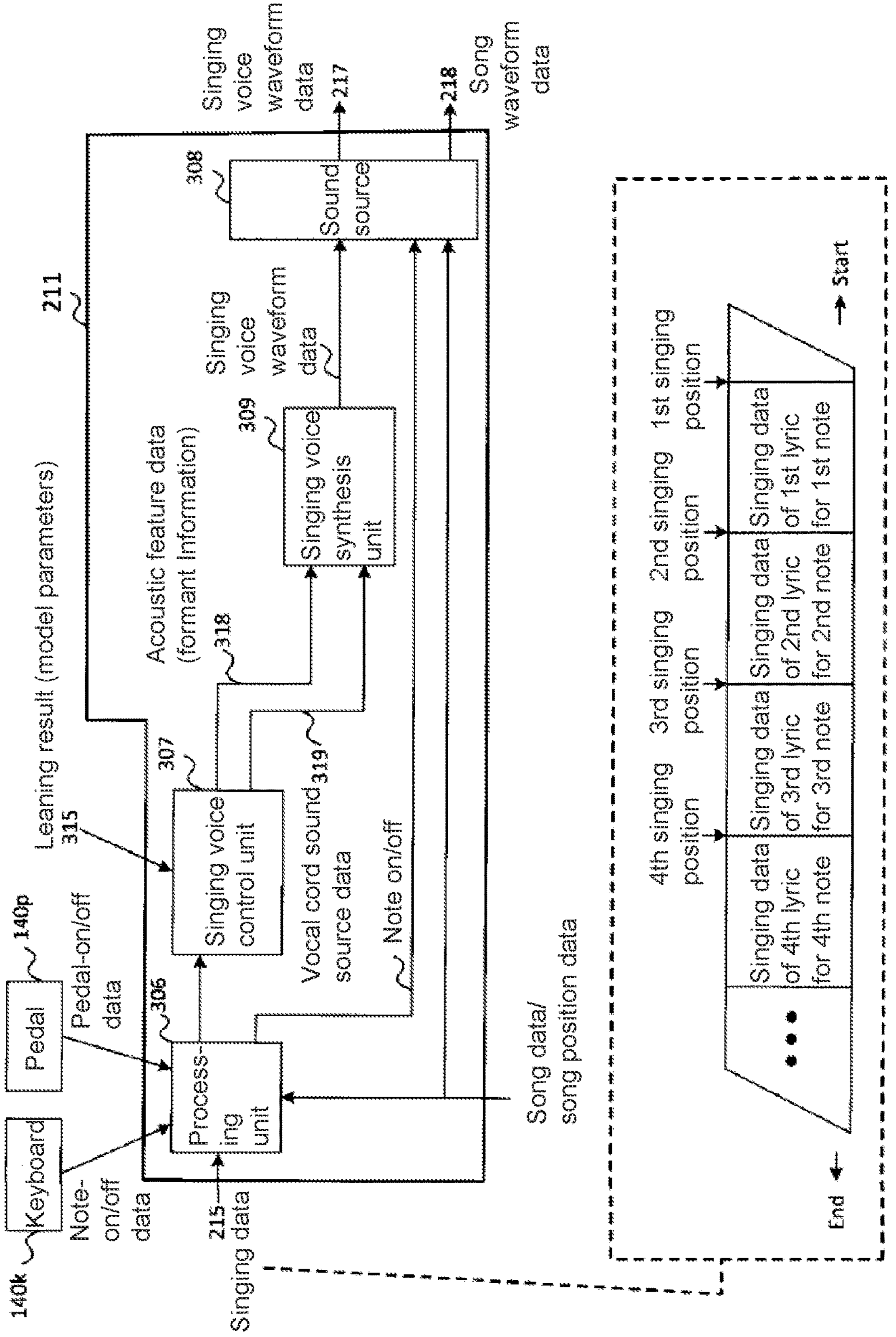
FIG. 5 shows another example of the waveform data output part 211 according to an embodiment.

FIG. 5 is a diagram showing another example of the waveform data output unit 211 according to another embodiment of the present invention. The contents overlapping with FIG. 4 will not be repeatedly described.

As described above, the singing voice control unit 307 of FIG. 5 estimates the acoustic feature sequence based on the acoustic model. Then, the singing voice control unit 307 outputs, to the singing voice synthesis unit 309, formant information 318 corresponding to the estimated acoustic feature sequence and vocal cord sound source data 319 (pitch information) corresponding to the estimated acoustic feature sequence. The singing voice control unit 307 may estimate the acoustic feature sequence by the maximum likelihood scheme.

The singing voice synthesis unit 309 generates data (for example, the singing voice waveform data of the n-th lyric corresponding to the n-th note) that is for generating a signal obtained by applying a digital filter, which models the vocal cord based on the sequence of the formant information 318, to a pulse train that is periodically repeated with the fundamental frequency (F0) contained in the vocal cord sound source data 319 and its power values (in the case of voiced sound elements), white noise (in the case of unvoiced phonetic elements) having a power value contained in the vocal cord sound source data 319, or a signal of a mixture thereof, and outputs the generated data to the sound source 308.

The sound source 308 generates and outputs singing voice waveform data 217, which is a digital signal, from the singing voice waveform data of the n-th lyrics corresponding to the sound to be produced (note-on) based on the note-on/off data input from the processing unit 306.

In the example of FIG. 5, the output singing voice waveform data 217 is generated using a sound generated by the sound source 308 based on the vocal cord sound source data 319 as the sound source signal, and is therefore a signal completely modeled by the singing voice control unit 307. Therefore, the singing voice waveform data 217 can generate a singing voice that is very faithful to the singing voice of the singer and is natural.

In this way, the voice synthesis of the present disclosure differs from the existing vocoder (a method of inputting words spoken by a human with a microphone and replacing them with musical instrument sounds) in that even if the user (performer) does not sing (in other words, the user does not sing and input a voice signal in real time to the electronic musical instrument 10), a synthesized voice can be output by operating the keyboard.

As described above, by adopting the technique of statistical voice synthesis processing as the voice synthesis method, it is possible to realize a much smaller memory capacity as compared with the conventional element piece synthesis method. For example, an electronic musical instrument of the elemental composition method requires a memory having a storage capacity of several hundred megabytes for voice elemental data, but in the present embodiment, in order to store the model parameters of the learning result 315, a memory with a storage capacity of only a few megabytes is required. Therefore, it is possible to realize a lower-priced electronic musical instrument, which makes it possible for a wider group of users group to use a high-quality singing voice performance system.

Further, in the conventional element data method, since the element data needs to be manually adjusted, it takes a huge amount of time (years or so) and labor to create the data for singing voice performance. However, in this embodiment, creating the model parameters of the training result 315 for the HMM acoustic model or the DNN acoustic model requires only a fraction of the creation time and effort because there is little data adjustment required. This also makes it possible to realize a lower-priced electronic musical instrument.

In addition, a general user can make the acoustic model learn his/her own voice, family's voice, celebrity's voice, etc., by using the learning function built in the server computer 300 that can be used as a cloud service, or in the voice synthesis LSI (in the waveform data output unit 211, for example), etc., and have the electronic musical instrument perform voice singing using the learned voice as the model voice. In this case as well, it is possible to realize a singing voice performance that is much more natural and has a higher sound quality than the conventional art as a lower-priced electronic musical instrument.

(Lyrics Progress Control Method)

A lyrics progression control method according to an embodiment of the present disclosure will be described below. The lyrics progress control method may be used by the processing unit 306 of the electronic musical instrument 10 described above.

Each of the following flowcharts may be performed by any one of the CPU 201, the waveform data output unit 211 (or the sound source LSI and/or voice synthesis LSI in the waveform data output unit 211), and any combinations thereof. For example, the CPU 201 may execute a control processing program loaded from the ROM 202 into the RAM 203 so as to execute each operation.

In addition, an initialization process may be performed at the start of the flow shown below. The initialization process includes interrupt processing, lyrics progression, derivation of TickTime, which is the reference time for automatic accompaniment, tempo setting, song selection, song reading, instrument sound selection, and other processing related to buttons, etc.

The CPU 201 can detect operations of the switch panel 140*b*, the keyboard 140*k*, the pedal 140*p*, and the like based on interrupts from the key scanner 206 at an appropriate timing, and can perform the corresponding processing.

In the following, an example of controlling the progress of lyrics is shown, but the target of the progress control is not limited to this. Based on this disclosure, for example, instead of lyrics, the progress of arbitrary character strings, sentences (for example, news scripts) and the like may be controlled. That is, the lyrics of the present disclosure may be replaced with characters, character strings, and the like.

Figure 6:
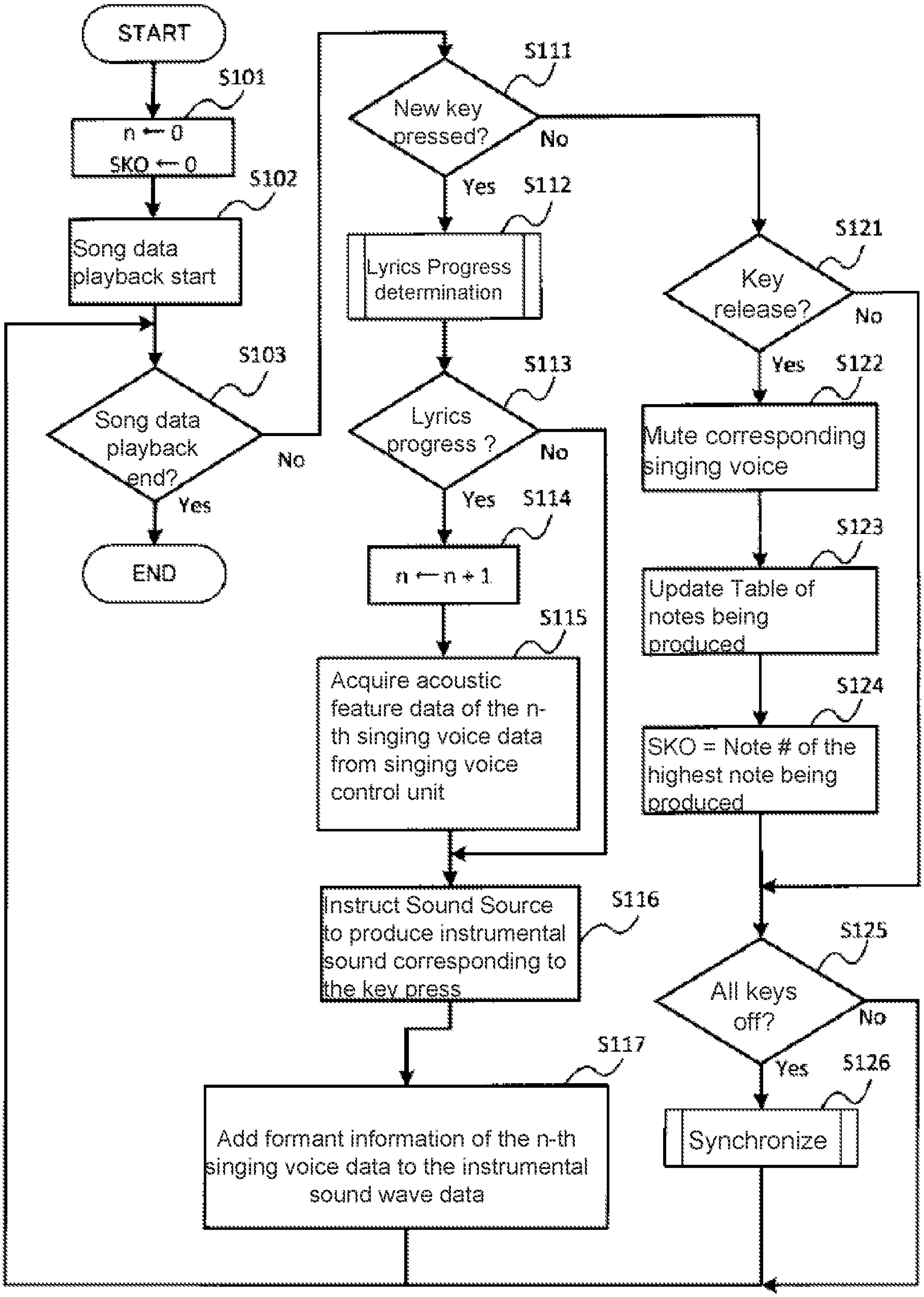
FIG. 6 shows an example of a flowchart of the lyrics progress control method according to an embodiment.

FIG. 6 is a diagram showing an example of a flowchart of the lyrics progression control method according to an embodiment of the present invention. Although the synthetic voice generation of this example shows an example based on FIG. 4, it may be based on FIG. 5.

First, the electronic musical instrument 10 substitutes 0 for the lyrics index (also expressed as "n") indicating the current position of the lyrics and the note number (also expressed as "SKO") indicating the highest note of the keys being pressed (step S101). When the lyrics are started from the middle (for example, starting from the previous stored position), a value other than 0 may be assigned to n.

The lyrics index is a variable indicating at what position a given syllable (or character) is located as counted from the beginning when the entire lyrics are regarded as a character string. For example, the lyrics index n may indicate the singing voice data at the n-th playback position of the singing data 215 shown in FIGS. 4 and 5 and the like. In the present disclosure, the lyric corresponding to a single position (lyric index) may correspond to one or a plurality of characters constituting one syllable. The syllables included in the singing data may include various syllables such as vowels only, consonants only, and consonants as well as vowels.

Step S101 may be triggered by the start of performance (for example, the start of playback of song data), the reading of the singing data, and the like.

In this embodiment, the electronic musical instrument 10 plays back song data (accompaniment) corresponding to the lyrics according to, for example, a user operation (step S102). The user can perform a key press operation in synchronization with the accompaniment so as to advance the lyrics.

The electronic musical instrument 10 determines whether or not the playback of the song data started in step S102 has been completed (step S103). When it is completed (step S103-Yes), the electronic musical instrument 10 may finish the process of the flowchart and return to the standby state.

Here, there may be no accompaniment. In this case, in step S102, the electronic musical instrument 10 may read the singing data that is designated based on the user's operation as the progress control target, and may determine whether or not all the singing data has been progressed in step S103.

When the reproduction of the song data is not completed (step S103-No), the electronic musical instrument 10 determines whether or not there is a new key press (a note-on event has occurred) (step S111). When there is a new key press (step S111-Yes), the electronic musical instrument 10 executes a lyrics progress determination process (a process for determining whether or not to advance the lyrics) (step S112). An example of this process will be described later. Then, the electronic musical instrument 10 determines whether or not the lyrics should progress (whether or not it is determined that the lyrics should be progressed) as a result of the lyrics progress determination processing (step S113).

When it is determined that the lyrics should be advanced (step S113-Yes), the electronic musical instrument 10 increments the lyrics index n (step S114). This increment is basically 1 increment (n+1 is substituted for n), but a value larger than 1 may be added depending on the result of the lyrics progress determination processing in step S112 or the like.

After incrementing the lyrics index, the electronic musical instrument 10 acquires the acoustic feature data (formant information) of the n-th singing voice data from the singing voice control unit 307 (step S115).

On the other hand, when it is determined not to advance the lyrics (step S113-No), the electronic musical instrument 10 does not change the lyrics index (maintains the value of the lyrics index). In this case, step S115 is not performed and bypassed.

After step S115 or S113-No, the electronic musical instrument 10 instructs the sound source 308 to produce a musical instrument sound having a pitch corresponding to the key press (generation of musical instrument sound wave data) (step S116). Then, the electronic musical instrument 10 instructs the singing voice synthesis unit 309 to add the formant information of the n-th singing voice data to the musical instrument (instrumental) sound waveform data that is outputted from the sound source 308 (step S117).

The electronic musical instrument 10 may continuously output the same sound (or a vowel of the same sound) without advancing the lyrics for the sound already being produced, or may output a sound based on the advanced lyrics. When the electronic musical instrument 10 produces a sound corresponding to the same lyrics index as the sound already being produced, the electronic musical instrument 10 may output the vowel of the lyrics. For example, when the lyric "Sle" is already being uttered and the same lyric is to be newly uttered, the electronic musical instrument 10 may newly produce the sound "e".

When there is no new key press (step S111-No), the electronic musical instrument 10 determines whether or not the key is newly released (a note-off event has occurred) (step S121). If there is a new key release (step S121-Yes), the electronic musical instrument 10 mutes the corresponding singing voice (step S122). Further, the electronic musical instrument 10 updates a note management table of notes that are being produced (step S123).

Here, the note management table may manage the note number of the key being produced (the key being pressed) and the time when the key pressing is started. In step S123, the electronic musical instrument 10 deletes information about the muted note from the note management table.

Further, the electronic musical instrument 10 substitutes the note number of the highest note among the notes that are being produced for the SKO (step S124).

Next, the electronic musical instrument 10 determines whether or not all the keys are off (step S125). When all the keys are off (step S125-Yes), the electronic musical instrument 10 performs a synchronization processing of the lyrics and the song (accompaniment) (step S126). The synchronization process will be described later.

After steps S117, S125-No and S126, the process returns to step S103.

In the electronic musical instrument 10 of the present disclosure, when a plurality of sounds are simultaneously produced, each sound may be produced using a synthetic voice having a different voice color. For example, when the user presses four keys to produce four sounds, the electronic musical instrument 10 may perform voice synthesis and to produce the voices of soprano, alto, tenor, and bass in order from the highest sound.

<Lyrics Progress Judgment Processing>

The lyrics progress determination process in step S112 will be described in detail below.

Figure 7:
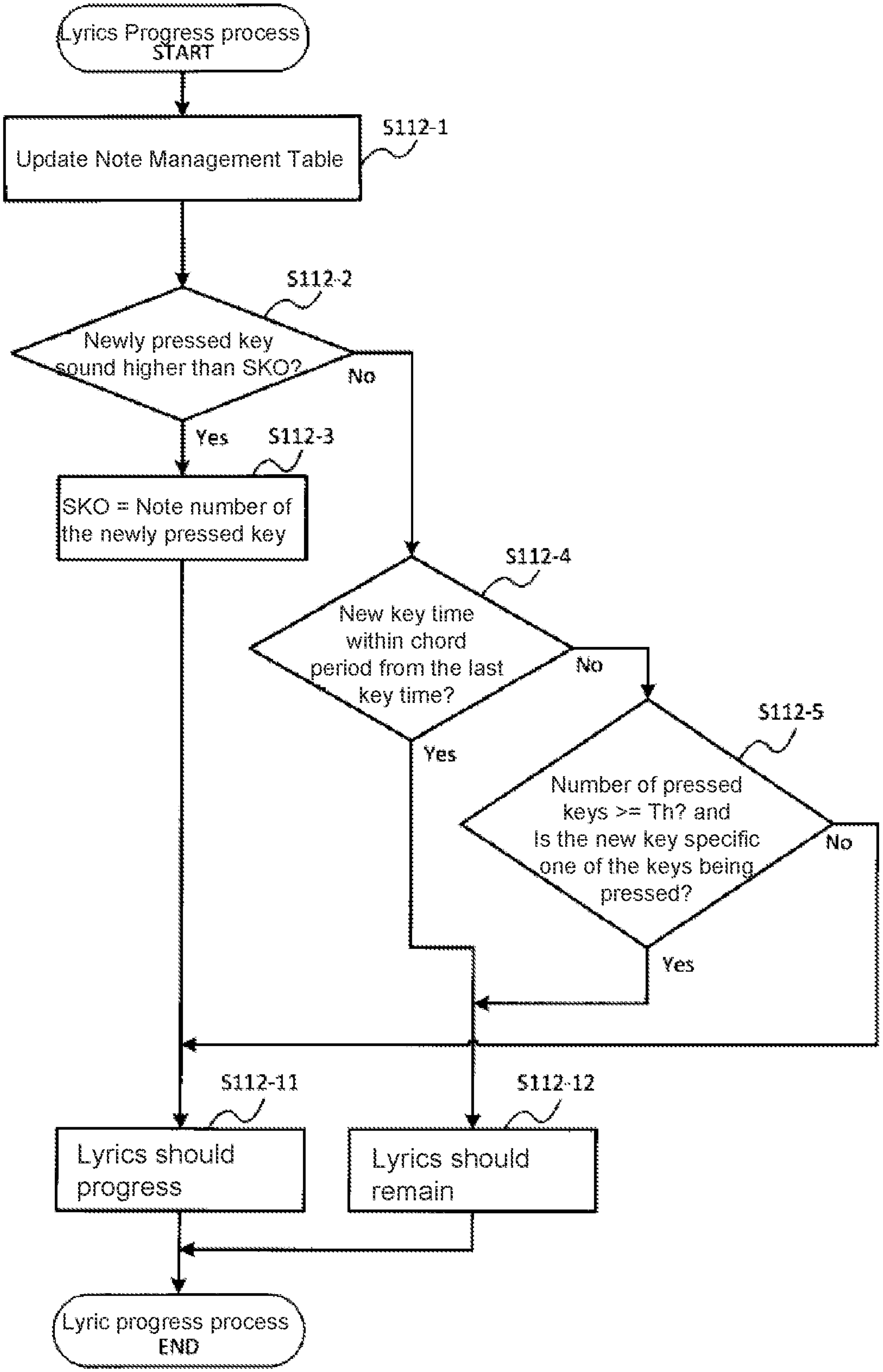
FIG. 7 shows an example of a flowchart of the lyrics progress determination processing based on chord voicing.

FIG. 7 is a diagram showing an example of a flowchart of a lyrics progression determination processing based on chord voicing. This exemplary process determines whether to advance the lyrics based on which pitch of the chord (which may be expressed as "what number", "which part", of the chord) is changed by the key press.

The electronic musical instrument 10 updates the note management table of notes being produced (step S112-1). Here, information about the note of the newly pressed key is added to the note management table. The key press time (also referred to as "key time") of the newly pressed key in step S111 may also be referred to as the current key press time (key time) or the latest key press time (key time), etc.

The electronic musical instrument 10 determines whether or not the sound of the newly pressed key is higher than that of the SKO (step S112-2). When the newly pressed key sound is higher than the SKO (step S112-2-Yes), the electronic musical instrument 10 substitutes the note number of the newly pressed key sound for the SKO and updates the SKO (step S112-3). Then, the electronic musical instrument 10 determines that the lyrics should progress (step S112-11). This is in consideration of the fact that the highest note (soprano part) usually corresponds to a melody.

When the newly pressed sound is not higher than SKO (step S112-2-No), the electronic musical instrument 10 determines whether the difference between the latest key press time (may also referred to as new key time or operating start timing) and the previous key press time (may also referred to as last key time or previous key operating start timing) is within a chord determination period that is a period such that if two or more notes are played within that time period, these notes are considered a part of a single chord (step S112-4). In other words, step S112-4 is a step determining whether the difference between the key pressing time of the newly pressed key and the key pressing time of the previously pressed key (or i times before (where i is an integer)) is within the chord determination period (also referred to as "chord period"). It is preferable that the past key pressing time to be compared here is the pressing time of a key that is still being pressed when the latest key is pressed.

Here, the chord determination period (chord period) is a period for judging that a plurality of sounds produced within the period are regarded as part of a chord, and that a plurality of sounds produced beyond that time period are regarded as independent sounds (for example, melody line sounds) or part of arpeggio. The chord determination period may be expressed in units of milliseconds or microseconds, for example.

The chord determination period may be set by the input of the user, or may be derived based on the tempo of the song. The chord determination period may also be referred to as a predetermined set period, set period, chord period, or the like.

When the difference between the latest key press time and the previous key press time is within the chord determination period (step S112-4-Yes), the electronic musical instrument 10 determines that the pressed sound is a chord that is simultaneously played (a chord is specified), and maintains the lyrics (the lyrics are not being advanced) (step S112-12).

If there is no past key press time within the chord determination period (step S112-4-No), the electronic musical instrument 10 judges whether the number of keys being currently pressed is equal to or greater than a predetermined threshold number and whether the newly pressed key sound is one of key sounds that are being currently produced (step S112-5). Here, in the case of step S112-4 being No, the electronic musical instrument 10 may determine that the chord designation has been canceled, or may determine that the chord is not designated.

The number of keys currently being pressed may be determined from the number of notes in the note management table. Further, the predetermined threshold number of keys may be, for example, four (assuming four voices of soprano, alto, tenor, and bass) or eight. Further, the specific key may be the key for the lowest note (corresponding to the bass part) among all the pressed notes, or the i-th (where i is an integer) high or low note. These predetermined threshold number, specific key/sound, etc., may be set by user operation or the like, or may be preset.

In the case of step S112-5 being Yes, the electronic musical instrument 10 determines that the lyrics should be maintained (step S112-12). In the case of step S112-5 being No, the electronic musical instrument 10 determines that the lyrics should progress (step S112-11).

In the process of step S112-4, even if a plurality of keys are pressed with the intention of producing a chord, the lyrics will not be advanced in accordance with the number of the pressed keys, and only one lyric is advanced.

According to the lyrics progression determination process of FIG. 7, for example, the lyrics can be advanced not when a plurality of sounds having small time differences are produced (simultaneous chord (harmony)), but when a plurality of sounds having large time differences (melody) are produced.

For example, when the key of the highest note changes when plural keys are being pressed to produce a chord (step S112-2-Yes), the lyrics can be advanced according to the key press of the highest note. On the other hand, if the top note of the chord that likely forms the melody is maintained, the lyrics can be controlled not to advance. This is effective when playing to reproduce a polyphonic chorus.

Further, it can be configured such that when the key press of the lowest note changes (step S112-5-Yes), the lyrics are not advanced according to the key press of the lowest note.

This means that if the pitch of only the lowest note of the chord changes, which would correspond to the bass part of a four-tone chorus, the lyrics will not be advanced if the chord of the upper part is maintained.

Further, it can be configured such that when the key press other than the lowest note changes (step S112-5-No), the lyrics is advanced according to the new key press. According to this configuration, the lyrics can be appropriately advanced when the part that can be in charge of the melody in the four-tone chorus is played independently apart from the chord.

In a modified embodiment, step S112-2, "whether or not the newly pressed sound is higher than SKO" may be replaced with "whether or not the newly pressed sound corresponds to the melody part".

In another modified embodiment, step S112-5, "whether the current number of key presses is equal to or greater than a predetermined threshold number and whether the newly pressed sound corresponds to a specific sound among all the sounds being pressed" may be replaced with "whether or not the pressed sound does not correspond to the melody part (or corresponds to the harmony part)".

Information on which sound corresponds to the melody (or harmony) part may be given in advance for each prescribed range of the lyrics. For example, such information may indicate that the melody part of the lyrics corresponding to the lyrics index=0 to 10 is the highest note among the notes to be pressed, and the melody part of the lyrics corresponding to the lyrics index=11 to 20 is the lowest note among these notes.

Such information may indicate melody (or harmony) notes by specifying what degree of height the note for the melody (or harmony) is placed among the chord being played and/or by specifying what pitch range (for example, hiA to hiG ♯) of notes corresponds to the melody (or harmony).

Based on the above information, for example, the electronic musical instrument 10 may recognize the highest note (soprano part) as the melody in the A verse and may recognize the third highest note (tenor part) in the bridge part.

Figure 8:
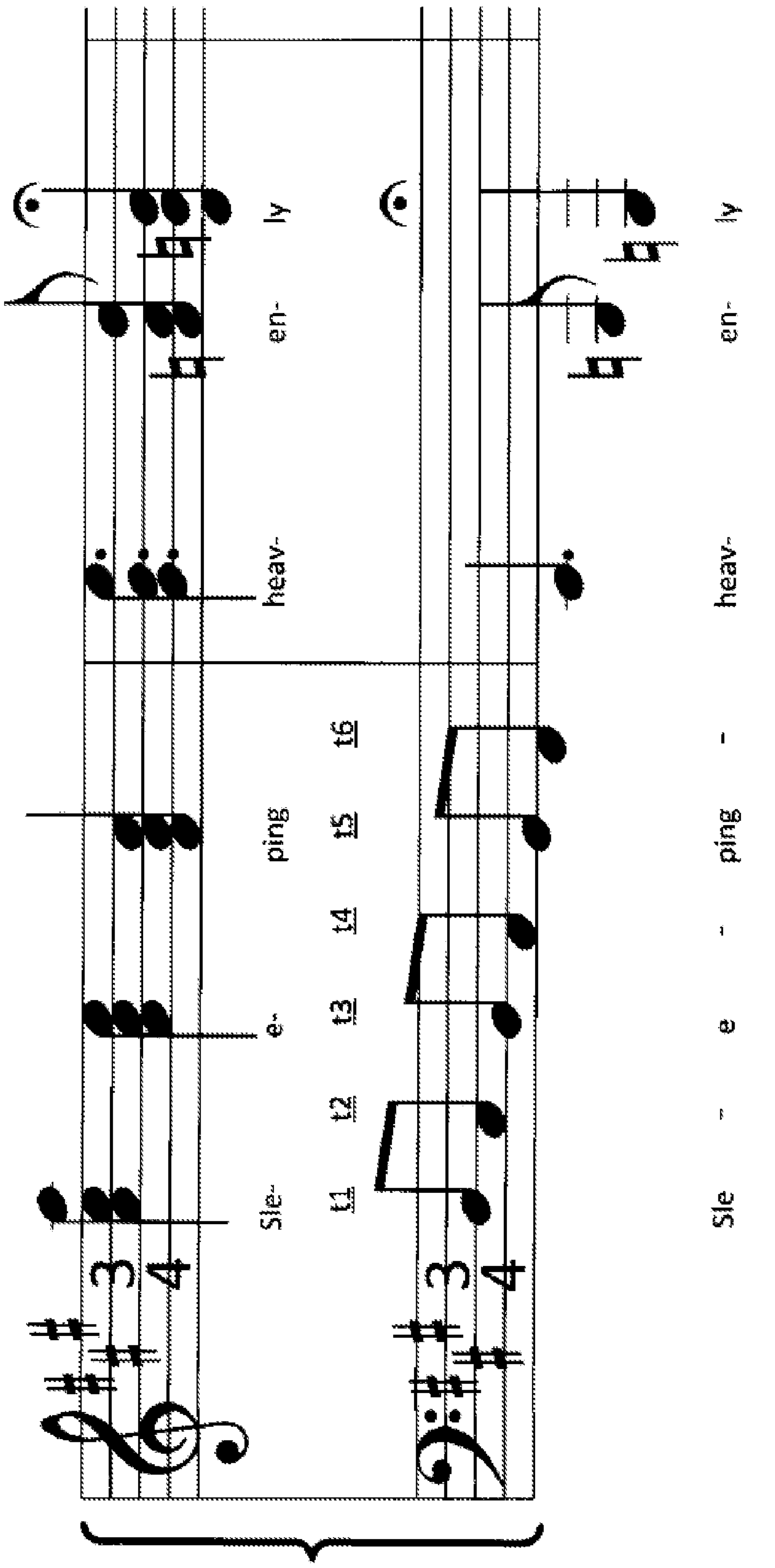
FIG. 8 shows an example of the lyrics progress controlled by using the lyrics progress determination process.

FIG. 8 is a diagram showing an example of lyrics progression controlled by using the lyrics progression determination process. In this example, the case where the user presses the key according to the illustrated score will be described. For example, the treble clef musical score may be pressed by the user's right hand, and the bass clef musical score may be pressed by the user's left hand. Further, "Sle", "e", "ping", "heav", "en" and "ly" correspond to the lyrics indices 1-6, respectively.

It is assumed that the chord determination period is shorter than the eighth note (for example, the length of the 32nd note). Further, it is assumed that the predetermined threshold number of step S112-5 described above is 4, and the specific note of step S112-5 is the lowest note.

First, at timing t1, four keys were pressed. The electronic musical instrument 10 performs the lyrics progress determination process of FIG. 7, and determines that the lyrics are advanced in step S112-11 because step S112-2 is Yes. Then, the electronic musical instrument 10 increments the lyrics index by 1 in step S114 to generate and output the lyrics "Sle" using the synthetic sounds of four voices.

Next, at the timing t2, the user moves the left hand to the "Do♯ (C♯)" key while continuously pressing the right hand keys. This sound corresponds to the lowest sound among the sounds that the electronic musical instrument 10 are producing at t2. Therefore, in performing the lyrics progression determination process of FIG. 7, the electronic musical instrument 10 determines that the lyrics should not be advanced in step S112-12 because step S112-5 is Yes. Then, the electronic musical instrument 10 generates and outputs the sound of the Do♯ using the vowel "e" of "Sle" that is already being produced while maintaining the lyrics index. The electronic musical instrument 10 continues to produce the other three voices.

Similarly, at t3, the electronic musical instrument 10 outputs the lyrics "e" with the sounds corresponding to the four keys, and at t4, maintains the lyrics and updates only the lowest sound. Further, the electronic musical instrument 10 outputs the lyrics "ping" with the sounds corresponding to the four keys at t5, and at t6, maintains the lyrics and updates only the lowest sound.

In the segment from t1 to t6 of the example of FIG. 8, the lyrics of the upper triads were assigned with one segment of the lyrics to each note, and the lyrics progressed for each key press. On the other hand, in the bass part, because it was judged to be the lowest note of the four tones, one segment was assigned to the two notes (melisma), and so there were sections where the lyrics did not progress for each key press.

<Synchronous Processing>

The synchronization process is a process of matching the position of the lyrics with the playback position of the current song data (accompaniment). According to this process, the position of the lyrics can be appropriately moved when the position of the lyrics is exceeded due to excessive key pressing, or when the position of the lyrics does not advance as expected due to insufficient key pressing.

Figure 9:
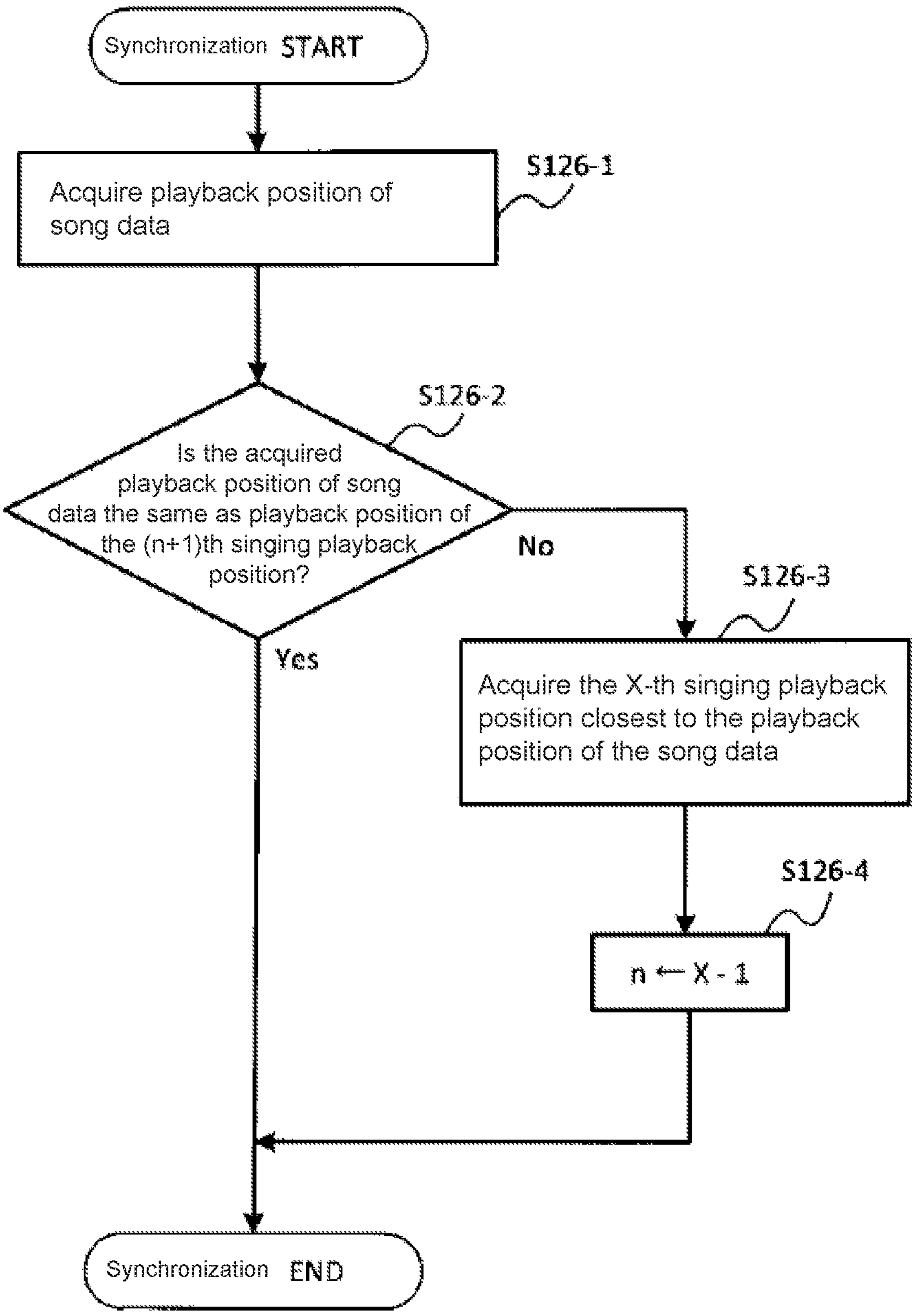
FIG. 9 shows an example of the flowchart of the synchronous processing.

FIG. 9 is a diagram showing an example of a flowchart of the synchronization process.

The electronic musical instrument 10 acquires the playback position of the song data (step S126-1). Then, the electronic musical instrument 10 determines whether or not the acquired playback position and the (n+1)th singing playback position coincide with each other (step S126-2).

The (n+1)th singing playback position may indicate a desirable timing for producing the (n+1)th note, which is derived in consideration of the total note length of the singing voice data up to the n-th singing voice.

When the playback position of the song data and the (n+1)th singing voice playback position match (step S126-2-Yes), the synchronization process is terminated. If not (step S126-2-No), the electronic musical instrument 10 acquires the X-th singing voice playback position that is closest to the playback position of the song data (step S126-3), and assign X−1 to n (step S126-4). Then the synchronization process may be completed.

If the accompaniment is not being played back, the synchronization process may be omitted. Alternatively, when the appropriate production timing of the lyrics can be derived based on the singing data, the electronic musical instrument 10 may adjust the position of the lyrics to be matched with the correct position based on the elapsed time from the start of the performance to the present, and the number of key pressing actions, even if the accompaniment is not played back.

According to the above-described embodiments, the lyrics can be appropriately advanced even when a plurality of keys are pressed at the same time.

Modification Examples

The voice synthesis processing shown in FIGS. 4 and 5 may be turned on or off based on an operation of the user's switch panel 140*b*, for example. When it is turned off, the waveform data output unit 211 may be configured to generate and output a sound source signal of musical instrument sound data having a pitch corresponding to the key press.

In the flowchart of FIG. 6, some steps may be omitted. If a decision diamond is omitted, it may be interpreted that the corresponding decision always proceeds to the route Yes or No in the flowchart as the case may be.

The electronic musical instrument 10 only needs to be able to control at least the position of the lyrics, and does not necessarily have to generate or output the sound corresponding to the lyrics. For example, the electronic musical instrument 10 may transmit sound wave data generated based on a key press to an external device (such as a server computer 300), and the external device generates/outputs synthetic voice based on the sound wave data.

The electronic musical instrument 10 may control the display 150*d* to display lyrics. For example, the lyrics near the current lyrics position (lyric index) may be displayed, and the lyrics corresponding to the sound being pronounced, the lyrics corresponding to the pronounced sound, and the like may be displayed by coloring them so as to show the current lyrics position.

The electronic musical instrument 10 may transmit at least one of singing voice data, information on the current position of lyrics, and the like to an external device. The external device may perform control to display the lyrics on its own display based on the received singing voice data, information on the current position of the lyrics, and the like.

In the above example, the electronic musical instrument 10 is a keyboard instrument such as a keyboard, but the present invention is not limited to this. The electronic musical instrument 10 may be an electric violin, an electric guitar, a drum, a trumpet, or the like, as long as it is a device having a configuration in which the timing of sound generation can be specified by a user's operation.

Therefore, the "key" of the present disclosure may be a string, a valve, another performance operating element for specifying a pitch, any other adequately provided performance operating element, or the like. The "key press" of the present disclosure may be a keystroke, picking, playing, operation of an operator, or the like. The "key release" in the present disclosure may be a string stop, a performance stop, an operator stop (non-operation), or the like.

The block diagram used in the description of the above embodiments shows blocks of functional units. These functional blocks (components) are realized by adequate combination of hardware and/or software. Further, a specific manner that realizes each functional block is not particularly limited; each functional block or any combinations of functional blocks may be realized by one or more processors, such as one physically connected device, or two or more physically separated devices connected by wire or wirelessly and these plurality of devices.

The terms described in the present disclosure and/or the terms necessary for understanding the present disclosure may be replaced with terms having the same or similar meanings.

The information, parameters, etc., described in the present disclosure may be represented using absolute values, relative values from a predetermined value, or other corresponding information. Moreover, the names used for parameters and the like in the present disclosure are not limited in any respect.

The information, signals, etc., described in the present disclosure may be represented using any of a variety of different technologies. For example, data, instructions, commands, information, signals, bits, symbols, chips, etc., that may be referred to throughout the above description are voltages, currents, electromagnetic waves, magnetic fields or magnetic particles, light fields or photons, or any combinations of them.

Information, signals, etc., may be input/output via a plurality of network nodes. The input/output information, signals, and the like may be stored in a specific location (for example, a memory), or may be managed using a table. Input/output information, signals, etc., can be overwritten, updated, or added. The output information, signals, etc., may be deleted. The input information, signals, etc., may be transmitted to other devices.

Regardless of whether called software, firmware, middleware, microcode, hardware description language, or another name, the term "software" used herein should broadly be interpreted to mean an instruction, instruction set, code, code segment, program code, program, subprogram, software module, applications, software applications, software packages, routines, subroutines, objects, executable files, execution threads, procedures, functions, or the like.

Further, software, instructions, information, and the like may be transmitted and received via a transmission medium. For example, when software is transmitted from a website, a server, or other remote source through wired technology (coaxial cable, fiber optic cable, twist pair, digital subscriber line (DSL: Digital Subscriber Line), etc.) and/or wireless technology (infrared, microwave, etc.), these wired and wireless technologies are included within the definition of the "transmission medium."

The respective aspects/embodiments described in the present disclosure may be used alone, in combination, or switched in accordance with manners of execution. In addition, the order of the processing procedures, sequences, flowcharts, etc., of each aspect/embodiment described in the present disclosure may be changed as long as there is no contradiction. For example, the methods described in the present disclosure present elements of various steps using an exemplary order, and are not limited to the particular order presented.

The phrase "based on" as used in this disclosure does not mean "based only on" unless otherwise stated. In other words, the phrase "based on" means both "based only on" and "based at least on".

Any reference to elements using designations such as "first", "second" as used in this disclosure does not generally limit the quantity or order of those elements. These designations can be used in the present disclosure as a convenient way to distinguish between two or more elements. Thus, references to the first and second elements do not mean that only two elements can be adopted or that the first element must somehow precede the second element.

When "include", "including" and variations thereof are used in the present disclosure, these terms are as comprehensive as the term "comprising". Furthermore, the term "or" used in the present disclosure is intended not to be an exclusive OR.

In the present disclosure, even if an article, for example "a," "an," of "the" in English, is added to a singular noun by translation, a case of a plural nouns may be included within the meaning of that expression.

Although the invention according to the present disclosure has been described in detail above, it is apparent to those skilled in the art that the invention according to the present disclosure is not limited to the embodiments described in the present disclosure. The invention according to the present disclosure can be implemented as a modified or modified mode without departing from the spirit and scope of the invention determined based on the description of the claims. Therefore, the description of the present disclosure is for purposes of illustration and does not bring any limiting meaning to the invention according to the present disclosure.

What is claimed is:

1. An electronic musical instrument that can output stored lyrics of a song in accordance with operations by a user, comprising:

a plurality of operating elements that receive the operations by the user, the plurality of operating elements respectively specifying different pitches; and one or more processors electrically connected to the plurality of operating elements, the one or more processors performing the following:

determining whether or not two or more operating elements among the plurality of operating elements are being operated simultaneously by the user;

while two or more operating elements are determined not being operated simultaneously by the user, thereby only one of the plurality of the operating elements being played by the user, determining that the lyrics should advance and causing a digitally synthesized voice with corresponding advanced lyrics to be produced for a pitch specified by the user operation specifying a single pitch; and while two or more operating elements are determined being operated simultaneously by the user, judging whether or not to advance the lyrics based on the operation of the user that specifies said two or more operating elements, and causing a digitally synthesized voice with a corresponding lyric to be produced for each of a plurality of pitches specified by the user operation.

2. The electronic musical instrument according to claim 1, wherein the one or more processors perform the following:

in judging whether or not to advance the lyrics while the two or more operating elements are determined being operated simultaneously by the user, judging whether a lowest note among the plurality of pitches specified has been changed by the two or more operating elements operated by the user;

if only the lowest note has been changed by the user, determining not to advance the lyrics; and if the lowest note has not been changed by the user, determining to advance the lyrics.

3. The electronic musical instrument according to claim 1, wherein the one or more processor further perform the following:

causing an automatic accompaniment to to be produced; and judging whether all of the plurality of the operating elements that have been played by the user are released, and if so, advancing a production position of the lyrics that is to be produced in accordance with a next operation by the user such that the production position of the lyrics corresponds to a production position of the automatic accompaniment.

4. The electronic musical instrument according to claim 1, wherein the one or more processor further perform the following in causing the digitally synthesized voice with the corresponding lyric to be produced for the pitch specified by the user operation specifying the single pitch or for each of the plurality of pitches specified by the user operation:

acquiring musical instrument sound data corresponding to the pitch or the plurality of pitches specified by the user operation; and adding formant information of the corresponding lyric to each of the musical instrument sound data so as to generate said digitally synthesized voice with the corresponding lyric for the single pitch or for each of the plurality of pitches specified by the user operation.

5. The electronic musical instrument according to claim 4, wherein the one or more processors acquires the formant information of the corresponding lyric by inputting data of the corresponding lyric to a trained acoustic model and causing the trained acoustic model to output the formant information.

6. The electronic musical instrument according to claim 5, wherein the trained acoustic model was machine-trained using a singing voice of a singer as training data so as to output the formant information representing acoustic features of the singer in response to the data of the corresponding lyric that is inputted.

7. The electronic musical instrument according to claim 1, wherein the judging of whether or not to advance the lyrics based on the operation of the user that specifies said two or more operating elements includes:

judging whether an operation start timing of a most recently operated operating element is within a prescribed time period from a previous operation start timing of said two or more operating element other than the most recently operated operating element; and if the operation start timing of the most recently operated operating element is within the prescribed time period, determining not to advance the lyric.

8. A method performed by one or more processors included in an electronic musical instrument that can output stored lyrics of a song in accordance with operations by a user, the electronic musical instrument including, in addition to the one or more processors, a plurality of operating elements that receive the operations by the user, the plurality of operating elements respectively specifying different pitches, the method comprising via the one or more processors:

determining whether or not two or more operating elements among the plurality of operating elements are being operated simultaneously by the user;

while two or more operating elements are determined not being operated simultaneously by the user, thereby only one of the plurality of the operating elements being played by the user, determining that the lyrics should advance and causing a digitally synthesized voice with corresponding advanced lyrics to be produced for a pitch specified by the user operation specifying a single pitch; and while two or more operating elements are determined being operated simultaneously by the user, judging whether or not to advance the lyrics based on the operation of the user that specifies said two or more operating elements, and causing a digitally synthesized voice with a corresponding lyric to be produced for each of a plurality of pitches specified by the user operation.

9. The method according to claim 8, wherein the judging of whether or not to advance the lyrics while the two or more operating elements are determined being operated simultaneously by the user includes:

judging whether a lowest note among the plurality of pitches specified has been changed by the two or more operating elements operated by the user;

if only the lowest note has been changed by the user, determining not to advance the lyrics, and if the lowest note has not been changed by the user, determining to advance the lyrics.

10. The method according to claim 8, further comprising via the one or more processors:

causing an automatic accompaniment to to be produced, and judging whether all of the plurality of the operating elements that have been played by the user are released, and if so, advancing a production position of the lyrics that is to be produced in accordance with a next operation by the user such that the production position of the lyrics corresponds to a production position of the automatic accompaniment.

11. The method according to claim 8, wherein the causing of the digitally synthesized voice with the corresponding lyric to be produced for the pitch specified by the user operation specifying the single pitch or for each of the plurality of pitches specified by the user operation includes:

acquiring musical instrument sound data corresponding to the pitch or the plurality of pitches specified by the user operation; and adding formant information of the corresponding lyric to each of the musical instrument sound data so as to generate said digitally synthesized voice with the corresponding lyric for the single pitch or for each of the plurality of pitches specified by the user operation.

12. The method according to claim 11, wherein the acquiring of the formant information of the corresponding lyric includes inputting data of the corresponding lyric to a trained acoustic model and causing the trained acoustic model to output the formant information.

13. The method according to claim 12, wherein the trained acoustic model was machine-trained using a singing voice of a singer as training data so as to output the formant information representing acoustic features of the singer in response to the data of the corresponding lyric that is inputted.

14. The method according to claim 1, wherein the judging of whether or not to advance the lyrics based on the operation of the user that specifies said two or more operating elements includes:

judging whether an operation timing of the most recently operated operating element is within a prescribed time period from a previous operation timing of said two or more operating element other than the most recently operated operating element; and if the operation timing of the most recently operated operating element is within the prescribed time period, determining not to advance the lyric.

15. A non-transitory computer-readable storage device storing instructions to be executed by one or more processors included in an electronic musical instrument that can output stored lyrics of a song in accordance with operations by a user, the electronic musical instrument including, in addition to the one or more processors, a plurality of operating elements that receive operations by the user, the plurality of operating elements respectively specifying different pitches, the instructions causing the one or more processors to perform the following:

determining whether or not two or more operating elements among the plurality of operating elements are being operated simultaneously by the user;

while two or more operating elements are determined not being operated simultaneously by the user, thereby only one of the plurality of the operating elements being played by the user, determining that the lyrics should advance and causing a digitally synthesized voice with corresponding advanced lyrics to be produced for a pitch specified by the user operation specifying a single pitch; and while two or more operating elements are determined being operated simultaneously by the user, judging whether or not to advance the lyrics based on the operation of the user that specifies said two or more operating elements, and causing a digitally synthesized voice with a corresponding lyric to be produced for each of a plurality of pitches specified by the user operation.

* * * * *